United States Patent [19]

Dushey

[11] 4,360,986
[45] Nov. 30, 1982

[54] ANIMAL TRAP

[76] Inventor: Phillip Dushey, 2220 Avenue J, Brooklyn, N.Y. 11210

[21] Appl. No.: 211,278

[22] Filed: Nov. 28, 1980

[51] Int. Cl.³ ............................................. A01M 23/30
[52] U.S. Cl. ....................................................... 43/82
[58] Field of Search ...................... 43/81, 81.5, 82, 83, 43/83.5

[56] References Cited

U.S. PATENT DOCUMENTS 1,462,102  7/1923  Dodson .................................... 43/82
2,263,161 11/1941  Brust ........................................ 43/81
2,656,641 10/1953  Dandridge .............................. 43/83
4,306,369 12/1981  Margulies ................................ 43/81

Primary Examiner—Nicholas P. Godici
Assistant Examiner—M. Jordan
Attorney, Agent, or Firm—Burgess, Ryan and Wayne

[57] ABSTRACT

A mousetrap in which the spring-loaded trapping bail is held in the set position by a dog disposed on a tab resiliently hinged to the frame of the trap. A trip lever causes the tab to be moved away from the bail when the bait is touched, so that the dog releases the bail, which then moves under the action of a coil spring to trap the animal.

8 Claims, 8 Drawing Figures

ANIMAL TRAP

This invention relates to an improved animal trap, particularly suitable for but not limited to the trapping of small animals.

Animal traps for small animals, such as mousetraps, of the type in which a bail arm is urged against one end of a platform by a strong coil spring, and held in a set position at the other end of the platform by some sort of pawl or other releasable engaging member, are well known in the art. See, e.g., U.S. Pat. Nos. 869,594; 891,880; 1,333,875; 1,458,404; 1,462,102; 1,483,688, and 1,796,503.

These prior art traps, however, generally suffer from undue complexity and consequent manufacturing expense, and/or inability to place the bait before and independently of the setting of the trap. The latter problem results in difficulty of setting the trap without injuring one's fingers.

Accordingly, an object of the present invention is to provide an improved animal trap overcoming the aforementioned disadvantages of prior art devices.

As herein described, there is provided an animal trap comprising a frame including a platform, an animal engaging element comprising a generally U-shaped bail, means for rotatably mounting said bail on said platform, for rotation about a transverse axis parallel to the platform between a tripped position adjacent one longitudinal end of the platform and a set position adjacent the other longitudinal end of the platform, spring means for urging said bail toward said tripped position, a tap resiliently hinged to said frame adjacent the other longitudinal end of said platform, for movement toward and away from said platform, means secured to said tab for releasably engaging said bail in a set position thereof, so that said bail is released upon movement of said tab with respect to said platform, a longitudinally disposed trip lever having a trip arm at one end of said lever, and a bail release arm engaging said tab at the other end of said lever, said trip arm being disposed between said pin and said one longitudinal end of said platform, and bait retention means connected to said trip arm.

IN THE DRAWING

Figure 1:
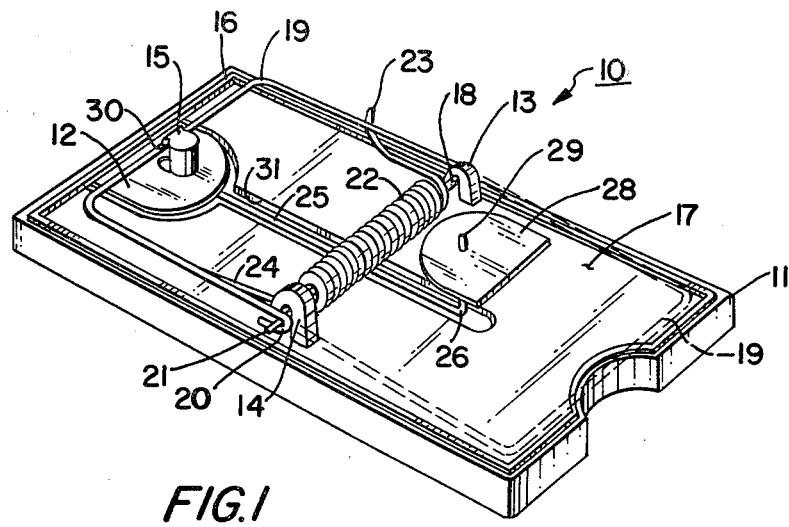
FIG. 1 is a perspective view of a mousetrap according to a preferred embodiment of the invention.
Figure 2:
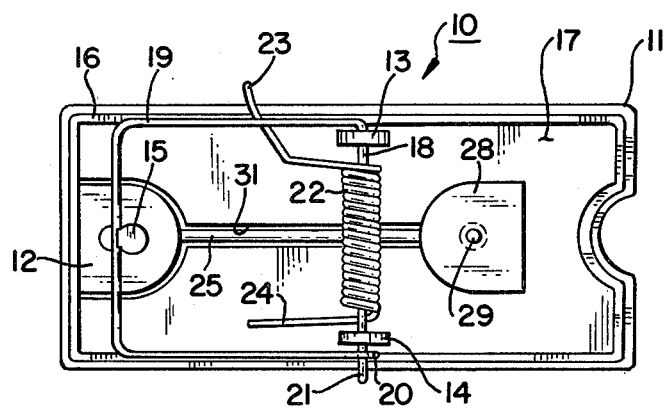
FIG. 2 is a top plan view thereof.
Figure 3:
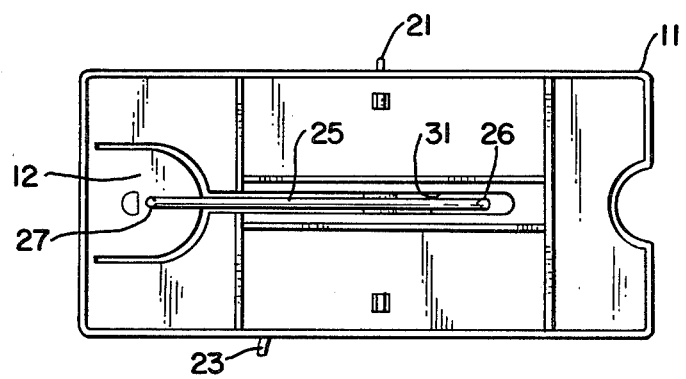
FIG. 3 is a bottom plan view thereof.
Figure 4:
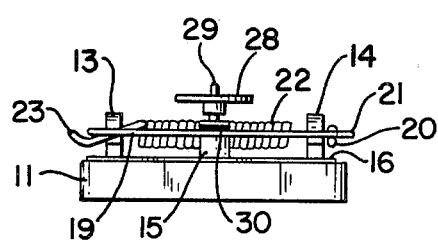
FIG. 4 is a left side elevation view thereof.
Figure 5:
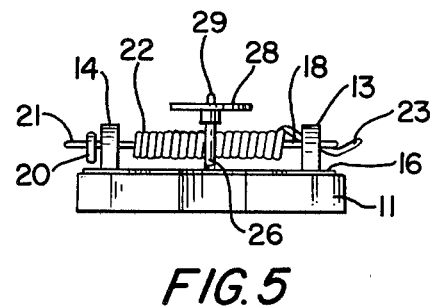
FIG. 5 is a right side elevation view thereof.
Figure 6:
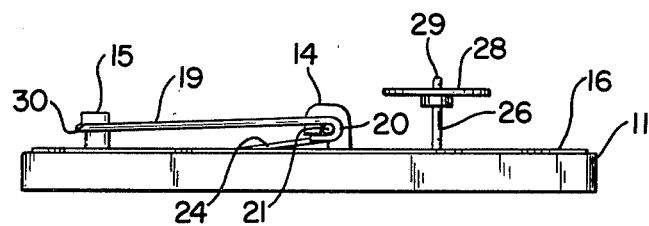
FIG. 6 is a front elevation view thereof.
Figure 7:
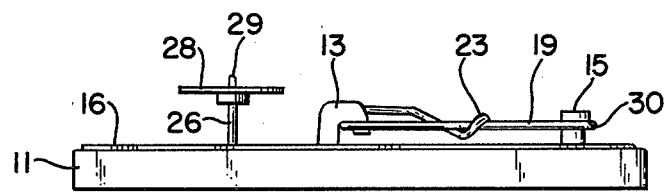
FIG. 7 is a rear elevation view thereof.
Figure 8:
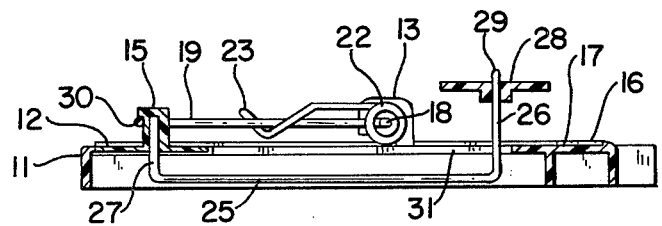
FIG. 8 is a front cross-sectional elevation view thereof.

As best seen in FIG. 1, the trap 10 comprises a unitary structure made of a suitable thermoplastic material such as acrylonitrile butadiene styrene (ABS), and includes a frame 11 with a tab 12 resiliently hinged thereto at one longitudinal end of the frame, a pair of transversely spaced ears 13 and 14 in the form of inverted hooks, and a bail engaging dog 15 extending upwardly from the tab 12.

To add strength and rigidity to the frame 11, it is provided with a peripheral ridge 16 formed in the platform 17 of the unitary thermoplastic structure, and with various reinforcing ribs disposed below the platform 17.

A unitary steel wire structure comprises a pin 18 extending between and secured in position by the ears 13 and 14, and a U-shaped bail 19 having one end integral with one end of the pin 18, and another end formed as a hook 20 engaging the adjacent end 21 of the pin 18. Preferably, the material forming the integral pin 18/bail 19 has some elasticity, so that the hook 20 is urged against the pin 21 thereby.

Wrapped around and coaxial with the pin 18 is a relatively strong coil spring 22, having at one end thereof an offset finger 23 which urges the bail 19 against one end of the platform 17, i.e., in the tripped position of the bail 19, shown in dashed lines. The other end of the coil spring 22 has an extension 24 which abuts the platform 17.

A longitudinally disposed trip lever 25 (not visible in FIG. 1) has a major portion disposed below the platform 17, with a trip arm 26 extending above the platform at one end of said lever, and a bail release arm 27 coupled to the dog 15 and the tab 12 at the other end of said lever.

The bait is supported and held in position by a thermoplastic deck 28 essentially parallel to the platform 17 and disposed above it, and an end portion 29 of the trip arm 26.

To set the trap, the bail 19 is rotated about the pin 18, against the action of the spring 22, to the set position shown in solid lines in FIG. 1, the bail being retained in position against the action of the spring 22 by the shoulder 30 of the dog 15.

When the bait is touched, the trip arm 26 is depressed, causing the bail release arm 27 to rotate the tab 12 away from the platform 17, so that the shoulder 30 of the dog 15 is moved away from the adjacent portion of the bail 19, thus releasing said bail, which thereupon is rapidly rotated about the pin 18 by the urging of the spring 22 and offset finger 23 thereof, to trap the animal between the bail and the platform 17.

Although as shown in FIG. 1, a slot 31 is provided for ease in manufacturing and assembly of the trap 10, said slot can be eliminated if desired, resulting in an increase in strength of the platform 17, so long as a hole in the platform 17 is provided for the trip arm 26.

Alternatively, the major portion 25 of the trip arm 26 can be provided by a sufficiently stiff plastic member formed integrally with the tab 12, in which case the structure of the tab itself in conjunction with the adjacent portion of said plastic arm, acts as the bail release arm 27.

What is claimed is:

1. An animal trap comprising a frame including a platform;
    a pair of transversely spaced ears secured to the platform;
    a pin extending and retained in position between said ears;
    a coil spring coaxial with, surrounding and being supported by said pin, said spring having an offset finger extending from one end thereof and a generally longitudinally disposed extension engaging said platform at the other end of said spring;
    an animal engaging element comprising a generally U-shaped bail having a first end secured to one end of said pin, and a second end comprising a hook engaging the other end of said pin, said bail being urged against one longitudinal end of said platform by said offset finger, to maintain said bail in a tripped position;
    a tab resiliently hinged to said frame at a hinge axis parallel to the center leg of said bail and adjacent the other longitudinal end of said platform for rotational movement about said hinge axis above and below said platform;

a dog mounted on said tab and having a shoulder adjacent said hinge axis for releasably engaging said bail in a set position thereof, between said dog and said hinge axis, so that said dog releases said bail when said tab is moved below said platform;

a longitudinally disposed trip lever having a major portion extending below said platform and a trip arm extending above said platform at one end of said lever, and a bail release arm affixed to said dog at the other end of said lever, so that said lever is mounted for rotation about said hinge axis, said trip arm being disposed between said pin and said one longitudinal end of said platform; and bait retention means connected to said trip arm, whereby deflection of said bait retention means by an animal causes said dog to release said bail from the set position thereof, whereupon said spring causes said bail arm to rapidly swing toward the tripped position thereof and to trap said animal between said bail arm and said platform.

2. The trap according to claim 1, wherein said tab is integral with said frame and platform.

3. The trap according to claim 1, wherein said pin is integral with said bail.

4. The trap according to claim 1 or 2 or 3, wherein said ears are integral with said platform.

5. The trap according to claim 1, wherein said frame, platform, tab and ears comprise a unitary mass of thermoplastic material.

6. The trap according to claim 1, wherein said bait retention means comprises a deck essentially parallel to said platform and an end portion of said trip arm protruding above said deck.

7. An animal trap comprising:
a frame including a platform;
a pair of transversely spaced ears secured to the platform;
a pin extending between said ears engaging said ears adjacent opposite ends thereof;
a coil spring coaxial with, surrounding and being supported by said pin, said spring having an offset finger extending from one end thereof and means for restraining the other end thereof;
an animal engaging element comprising a generally U-shaped bail secured at the ends thereof to corresponding ends of said pin, with said offset finger engaging one leg of said bail to maintain said bail in a tripped position against one longitudinal end of said platform;
a tab resiliently hinged to said frame at a hinge axis parallel to the center leg of said bail and adjacent the other longitudinal end of said platform, for rotational movement about said hinge axis above and below said platform;
means secured to said tab for releasably engaging said bail in a set position thereof, between said means secured to said tab and said hinge axis, so that said bail is released upon movement of said tab with respect to said platform;
a longitudinally disposed trip lever having a major portion extending below said platform and a trip arm at one end of said lever, and a bail release arm affixed to said tab at the other end of said lever, so that said lever is mounted for rotation about said hinge axis, said trip arm being disposed between said pin and said one longitudinal end of said platform; and
bait retention means connected to said trip arm.

8. An animal trap comprising:
a frame including a platform;
an animal engaging element comprising a generally U-shaped bail;
means for rotatably mounting said bail on said platform, for rotation about a transverse axis parallel to the platform between a tripped position adjacent one longitudinal end of the platform and a set position adjacent the other longitudinal end of the platform;
spring means for urging said bail toward said tripped position;
a tab resiliently hinged to said frame at a hinge axis parallel to the center leg of said bail and adjacent the other longitudinal end of said platform, for rotational movement about said hinge axis above and below said platform;
means secured to said tab for releasably engaging said bail in a set position thereof, between said means secured to said tab and said hinge axis, so that said bail is released upon movement of said tab below said platform;
a longitudinally disposed trip lever having a major portion below said platform and a trip arm at one end of said lever, and a bail release arm engaging said tab at the other end of said lever, so that said lever is mounted for rotation about said hinge axis, said trip arm being disposed between said pin and said one longitudinal end of said platform; and
bait retention means connected to said trip arm.

* * * * *